Sept. 27, 1955     T. D. CACCIATORE     2,718,852
MOVABLE MEATHOOK
Filed Oct. 19, 1954
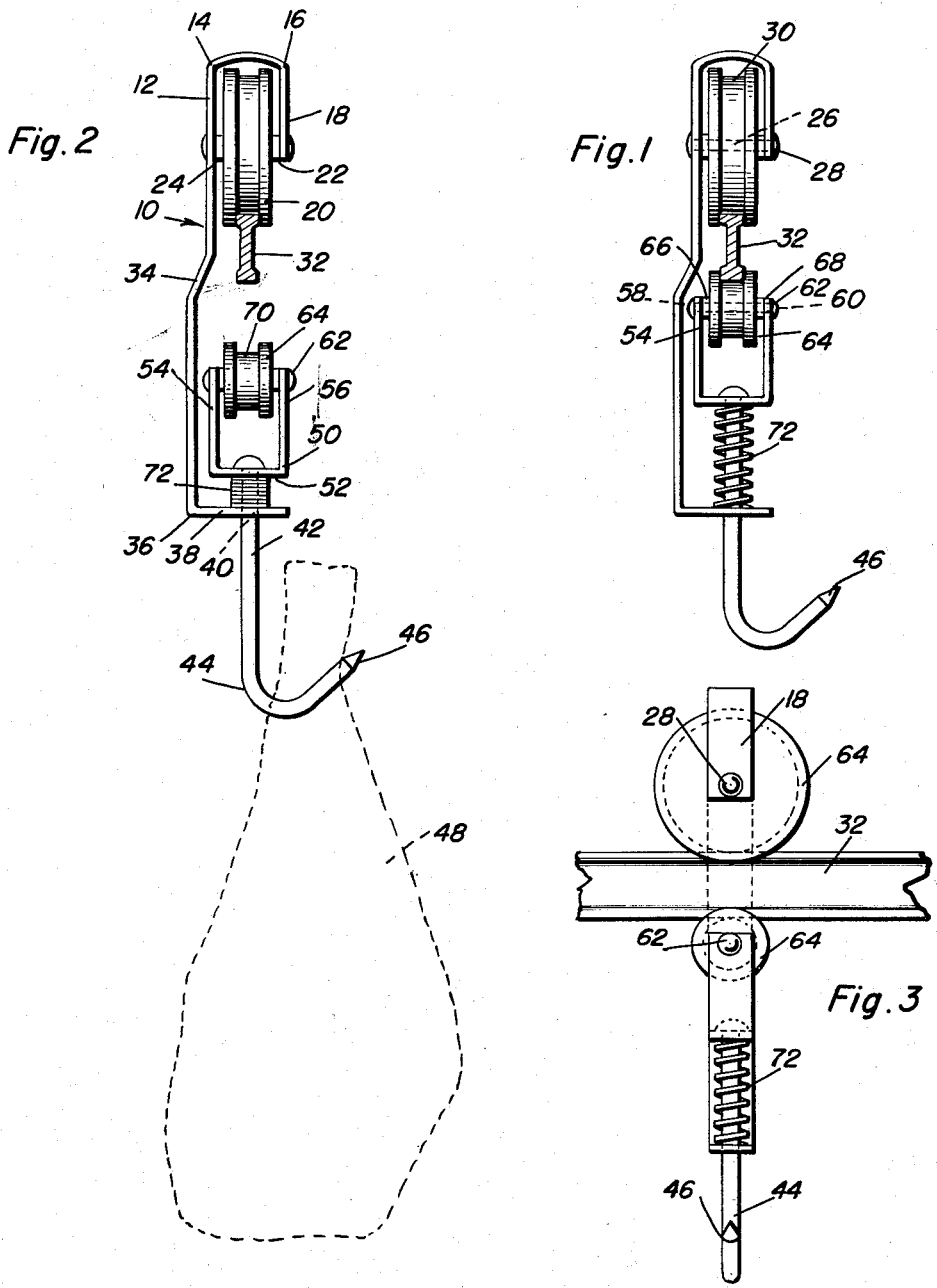
Tony D. Cacciatore
INVENTOR.

United States Patent Office 2,718,852
Patented Sept. 27, 1955

2,718,852

MOVABLE MEATHOOK

Tony D. Cacciatore, Tampa, Fla.

Application October 19, 1954, Serial No. 463,279

4 Claims. (Cl. 105—153)

This invention relates in general to food storage, and more particularly to new and improved means of hanging and handling meat.

Heretofore the removal of any large piece of meat from a meathook, which is suspended from a rail, has been a somewhat hit-or-miss affair. Sometimes the meat would come off the hook, but just as many times as it came off the hook, so did the hook come off the rail. There was always the possibility that the hook would dislodge itself from the meat and either fall to the floor or onto the head, body or arms of the person handling the meat. If the hook falls to the floor it becomes covered with sawdust, which covers the floor and has to be cleaned. Further, if it strikes the person handling the meat there is always the possibility of doing real bodily harm to that person, for the meathook is sharp enough and heavy enough to inflict a serious wound.

Therefore, the primary object of this invention is to provide a movable meathook that has incorporated into it a safety mechanism that will allow the handlers of meat to remove meat from the hook without endangering themselves.

A further object of this invention is to provide a meathook that is easily movable along a track or rail without lifting, of the sometimes very heavy pieces of meat.

A still further object of this invention is to provide a meathook that will offer lateral resistance while a piece of meat is being hung on it, but is still easily moved after the full weight of the meat comes to rest on it.

Another object of this invention is to provide a meathook that is easily moved along a track or rail but at the same time may be easily removed from that track or rail to facilitate cleaning, storage or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side view of the movable meathook showing a lower wheel being spring urged into engagement with a rail upon which the meathook hangs;

Figure 2 is a side view of the movable meathook, with a round of meat shown in dotted lines and showing how the weight of such a piece of meat will compress the spring and disengage the lower pulley; and Figure 3 is a front view of the movable meathook, showing the relation of the two wheels while both are in engagement with the rail.

Referring now to the drawings in detail:

The movable meathook consists of a main frame member, designated by the reference numeral 10, having on its upper portion 12 two bends 14 and 16 and thus forming a tang 18 which is parallel to and spaced from the upper portion 12 so as to allow the placement of an upper wheel 20 between the tang 18 and the upper portion 12. The wheel 20 has two bosses 22 and 24 integral with and centrally disposed on its axis, which serve as spacers to prevent the sides of the wheel 20 from rubbing on the tang 18 or the upper portion 12 thus preventing undue friction between these members. The wheel 20 has through its center a bore 26, shown in dotted lines in Figure 1, by which it is rotatably supported between the tang 18 and upper portion 12 on a pin 28 which, in turn, passes through the tang 18 and the upper portion 12 and is riveted or the like to prevent undue lateral movement of the wheel 20. The wheel 20 has disposed around the circumference thereof a groove 30 which engages a rail 32 or the like and in so doing prevents accidental dislodging of the wheel 20 from the rail 32 while the meathook is being moved.

The main frame member 10 has at an intermediate portion an offset 34 which is primarily for the purpose of balance, but also serves another purpose which will be described hereinafter.

The lower portion of the main frame member 10 is bent at an angle 36 whereby an ear 38 is in parallel relation to the axis of the upper wheel 20. The ear 38 has through it a hole 40, as seen in dotted lines in Figure 2, which slidably receives a shank 42 of the hook 44. The hole 40 is so disposed in the ear 38 as to be in line with the rail 32 and thus guide the shank 42 of the hook 44 in alignment with the rail 32.

The hook 44, as the name implies, is bent in the form of a hook at the lower end thereof and has at its outer extremity a pointed portion 46 to facilitate the easy impinging of meat 48 on the hook 44.

The shank 42 passes through yoke 50 and is secured thereto by riveting or the like. The yoke 50 has upstanding from and integral with a base 52, two supports 54 and 56, which are equal in length and in normal position parallel to the main frame 10. The supports 54 and 56 have holes 58 and 60 near the outer extremities thereof as is best seen in Figure 1. A pin 62 extends through holes 58 and 60 and supports a lower wheel 64. The axes of the lower wheel 64 is substantially parallel to the axis of the upper wheel 20, and generally conforms to the shape of the upper wheel 20 wherein two bosses 66 and 68 are provided which serve the same purpose as the bosses 22 and 24 on the upper wheel 20, and a groove 70 is provided in the circumference of lower wheel 64 which engages the rail 32 when there is no meat hanging on the meathook 44.

Disposed between the base 52, of the yoke 50, and the ear 38, is a spring 72 in surrounding relation to the shank 42 which retains the spring between ear 38 and the base 52. As the meat is lifted from the hook 44 the spring 72 forces the yoke 50 upwardly, thus engaging the groove 70 on the lower surface of the rail 32. The grooves 30 and 70 are then in contact with the rail 32 thereby preventing dislodgement of the meathook from the rail 32 during actual removal of the meat 48 from the hook 44.

As is noted in Figure 1 the offset 34 is provided in the frame 10 to afford clearance for the support 54 which carries the lower wheel 64.

In operation, the movable meat hook being in a resting position on the rail 32, as is best seen in Figure 1, the meat 48 is impinged on the point 46 and then down on the hook 44. As the weight of the meat 48 is released and becomes fully supported by the hook 44, the entire lower assembly consisting of the hook 44, the yoke 50 and the lower wheel 64 moves downwardly compressing the spring 72 in so doing. The movable meathook may then be moved along the rail for storage of the meat 48 or to another point for removal of the meat 48. In order to remove the meat 48 from the movable meathook after the desired destination is reached, the weight of the meat 48 is raised, allowing the compressed spring 72 to raise the entire lower assembly which consists of the hook 44, the yoke 50 and the lower wheel 64. In raising, the groove 70 in the lower wheel 64 engages the rail 32 and the meat 48 may be moved laterally and thus removed from the hook 44.

It should be noted, as shown in Figure 1, that lateral movement of the movable meathook is prevented by the engagement of the groove 30 in the upper wheel and the groove 70 in the lower wheel, on the rail 32, both during unloading and loading of the movable meathook.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A meathook for movement along a track rail and adapted to receive the weight of a piece of meat, the meathook consisting of a wheel rollingly supported on said rail, an axle extending through the wheel, a supporting member depending from the axle, a hook member carried by said supporting member, said hook being vertically slidably mounted on said supporting member, resilient means urging said hook upwardly when unloaded, a weight responsive rail engaging means mounted on the upper end of said hook and including a roller for engaging the surface of the rail in opposition to said wheel, a U-shaped member having the bight portion secured to the upper end of said hook and journaling the roller between the ends of the leg portions thereof, said resilient means including a coil spring in engagement with said U-shaped member and said supporting member for urging the roller into engagement with the lower edge of the rail.

2. A meathook for movement along a track rail and adapted to receive the weight of a piece of meat, the meathook consisting of a wheel rollingly supported on said rail, an axle extending through the wheel, a supporting member depending from the axle, a hook member carried by said supporting member, said hook being vertically slidably mounted on said supporting member, resilient means urging said hook upwardly when unloaded, a weight responsive rail engaging means mounted on the upper end of said hook and including a roller for engaging the surface of the rail in opposition to said wheel, a U-shaped member having the bight portion secured to the upper end of said hook and journaling the roller between the ends of the leg portions thereof, said resilient means including a coil spring in engagement with said U-shaped member and said supporting member for urging the roller into engagement with the lower edge of the rail, said wheel having a peripheral guide groove for receiving the upper edge of the rail, said roller being provided with a peripheral groove for receiving the lower edge of the rail thereby preventing lateral displacement of the meathook.

3. A meathook for movement on an overhead rail comprising an elongated vertically disposed frame, a reversely bent portion on the upper end of said frame forming a tang in spaced parallel relation to the upper portion of the frame, a pin extending between the tang and upper portion of the frame, an upper wheel rotatably mounted on said pin, a peripheral groove on said wheel for receiving the upper edge of the rail, a rightangularly extending apertured ear integrally formed on the lower end of the frame and extending under the lower edge of the rail in spaced relation thereto, a hook having a vertical shank portion slidably received in the aperture in said ear, a U-shaped member having its bight portion secured to the upper end of the shank, a pin extending between the legs of the U-shaped member, a lower wheel rotatably supported on said pin, a peripheral groove on said lower wheel for receiving the lower edge of the rail, a coil spring disposed around the hook shank between the upper surface of said ear and undersurface of the bight portion of said U-shaped member for urging the lower wheel towards the rail, and a load engaging hook bill on the lower end of said shank, said spring being compressed when a load is positioned on said hook bill, thereby disengaging the lower wheel from the rail and expanding when the load is removed from the hook bill thereby engaging the lower wheel with the lower edge of the rail wherein the grooves will preclude accidental lateral displacement of the meathook.

4. A meathook for movement along a track rail and adapted to receive the weight of a piece of meat, the meathook consisting of a wheel rollingly supported on said rail, an axle extending through the wheel, a supporting member depending from the axle, a hook member carried by said supporting member, said hook being vertically slidably mounted on said supporting member, resilient means urging said hook upwardly when unloaded, a weight responsive rail engaging means mounted on the upper end of said hook and including a roller for engaging the surface of the rail in opposition to said wheel, a U-shaped member having the bight portion secured to the upper end of said hook and journaling the roller between the ends of the leg portions thereof, said resilient means including a coil spring in engagement with said U-shaped member and said supporting member for urging the roller into engagement with the lower edge of the rail, thus preventing dislodgment of the meathook from the rail when impinging a piece of meat on the meathook and allowing the meathook to be rolled along said rail whether loaded or unloaded.

References Cited in the file of this patent

UNITED STATES PATENTS

| | | |
|---|---|---|
| 1,383,383 | Broga | July 5, 1921 |
| 2,114,929 | Lefiell | Apr. 19, 1938 |
| 2,162,688 | Lawrence | June 13, 1939 |